(12) United States Patent
Kinder

(10) Patent No.: US 10,320,296 B2
(45) Date of Patent: Jun. 11, 2019

(54) MULTI-PHASE VOLTAGE REGULATOR SYSTEM

(71) Applicant: Taiwan Semiconductor Manufacturing Co., Ltd., Hsinchu (TW)

(72) Inventor: Russell Kinder, Austin, TX (US)

(73) Assignee: Taiwan Semiconductor Manufacturing Co., Ltd. (TW)

( * ) Notice: Subject to any disclaimer, the term of this patent is extended or adjusted under 35 U.S.C. 154(b) by 0 days.

(21) Appl. No.: 15/941,496

(22) Filed: Mar. 30, 2018

(65) Prior Publication Data

US 2019/0097537 A1 Mar. 28, 2019

Related U.S. Application Data

(60) Provisional application No. 62/563,866, filed on Sep. 27, 2017.

(51) Int. Cl.
*H02M 3/158* (2006.01)

(52) U.S. Cl.
CPC ........ *H02M 3/1584* (2013.01); *H02M 3/1588* (2013.01)

(58) Field of Classification Search
None
See application file for complete search history.

(56) References Cited

U.S. PATENT DOCUMENTS

| | | | |
|---|---|---|---|
| 6,278,263 B1 * | 8/2001 | Walters ..................... | G06F 1/28 323/272 |
| 6,897,636 B2 * | 5/2005 | Harris ..................... | H02J 1/102 323/272 |

(Continued)

FOREIGN PATENT DOCUMENTS

| | | |
|---|---|---|
| CN | 101204002 A | 6/2008 |
| CN | 101813956 B | 10/2014 |

(Continued)

*Primary Examiner* — Gary L Laxton
*Assistant Examiner* — Peter M Novak
(74) *Attorney, Agent, or Firm* — Sterne, Kessler, Goldstein & Fox, P.L.L.C.

(57) ABSTRACT

Multiphase voltage regulator systems are disclosed which include parallel signal pathways that functionally cooperate to provide an analog output signal at a constant, or substantially constant, voltage. The parallel signal pathways generate energy storage element charging signals to charge and/or discharge energy storage elements. Energy provided by discharging energy storage elements is thereafter combined to provide the analog output signal. Moreover, the parallel signal pathways compare one of the energy storage element charging signals with a reference input signal to provide a global error correction signal representing a difference, or error, between the reference input signal and the analog output signal. The parallel signal pathways thereafter adjust the energy storage element charging signals in accordance with the global error correction signal to lessen this difference or error. In some situations, manufacturing variations and/or misalignment tolerances present within the parallel signal pathways can cause mismatches between the parallel signal pathways. In these situations, the parallel signal pathways compare remaining energy storage element charging signals to the global error correction signal to provide local error correction signals to quantify these mismatches. Thereafter, the parallel signal pathways adjust the remaining energy storage element charging signals in accordance with the one or more local error correction signals to compensate for these mismatches.

20 Claims, 6 Drawing Sheets

(56) References Cited

U.S. PATENT DOCUMENTS

| | | |
|---|---|---|
| 6,943,535 B1 | 9/2005 | Schiff |
| 7,492,136 B2 | 2/2009 | Schuellein |
| 8,044,645 B2 | 10/2011 | Zambetti et al. |
| 8,063,617 B2 | 11/2011 | Wang et al. |
| 8,228,049 B2 | 7/2012 | Qiu et al. |
| 8,264,213 B2 | 9/2012 | Lin et al. |
| 2003/0214354 A1* | 11/2003 | Chen ................... H02J 1/102 330/124 D |
| 2005/0141251 A1 | 6/2005 | Allwyn et al. |
| 2008/0315853 A1* | 12/2008 | Capilla ............... H02M 3/1588 323/288 |
| 2013/0076322 A1 | 3/2013 | Tateno et al. |

FOREIGN PATENT DOCUMENTS

| | | |
|---|---|---|
| JP | 2007-135390 A | 5/2007 |
| TW | 1343710 | 6/2011 |
| TW | 1396957 | 5/2013 |
| TW | 1535162 | 5/2016 |

* cited by examiner

MULTI-PHASE VOLTAGE REGULATOR SYSTEM

CROSS-REFERENCE TO RELATED APPLICATIONS

The present application claims the benefit of U.S. Provisional Patent Appl. No. 62/563,866, filed Sep. 27, 2017, which is incorporated herein by reference in its entirety.

BACKGROUND

Advances in technology and engineering have allowed designers and manufacturers to offer more portable electronic devices to consumers. These portable electronic devices range from mobile computing devices, also referred to as handheld computers, to mobile communication devices. At the heart of the portable electronic devices lies one or more voltage regulators to provide a constant, or a substantially constant, output voltages for operation. A voltage regulator essentially stabilizes an output voltage used by processors, memories, and other elements of the portable electronic devices. During operation, the voltage regulator compares the output voltage and a reference voltage to determine a voltage error between the output voltage and the reference voltage. The voltage regulator adjusts the output voltage in accordance with the voltage error to reduce the voltage error.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
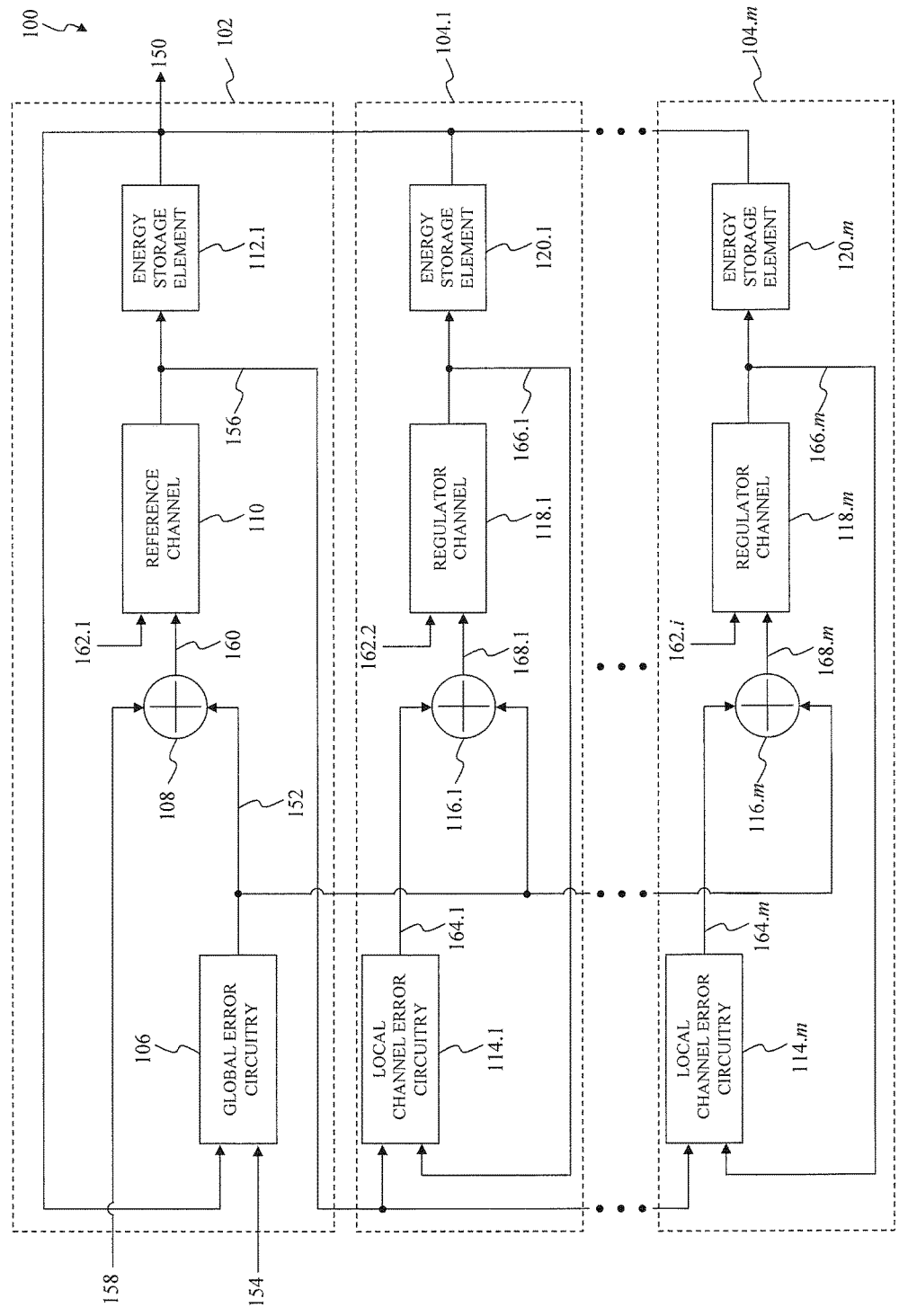
FIG. 1 illustrates a block diagram of an exemplary voltage regulator system according to an exemplary embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is does not in itself dictate a relationship between the various embodiments and/or configurations described.

Overview

Multiphase voltage regulator systems are disclosed which include parallel signal pathways that functionally cooperate to provide an analog output signal at a constant, or substantially constant, voltage. The parallel signal pathways generate energy storage element charging signals to charge and/or discharge energy storage elements. Energy provided by discharging energy storage elements is thereafter combined to provide the analog output signal. Moreover, the parallel signal pathways compare one of the energy storage element charging signals with a reference input signal to provide a global error correction signal representing a difference, or error, between the reference input signal and the analog output signal. The parallel signal pathways thereafter adjust the energy storage element charging signals in accordance with the global error correction signal to lessen this difference or error. In some situations, manufacturing variations and/or misalignment tolerances present within the parallel signal pathways can cause mismatches between the parallel signal pathways. In these situations, the parallel signal pathways compare remaining energy storage element charging signals to the global error correction signal to provide local error correction signals to quantify these mismatches. Thereafter, the parallel signal pathways adjust the remaining energy storage element charging signals in accordance with the one or more local error correction signals to compensate for these mismatches.

First Exemplary Voltage Regulator System

FIG. 1 illustrates a block diagram of an exemplary voltage regulator system according to an exemplary embodiment of the present disclosure. A multiphase voltage regulator system 100 generates energy storage element charging signals to charge and/or discharge energy storage elements. For example, energy provided by discharging energy storage elements is thereafter combined to provide an analog output signal 150. Moreover, the multiphase voltage regulator system 100 compares one of the energy storage element charging signals with a reference input signal to provide a global error correction signal representing a difference or error between the reference input signal and the analog output signal 150. The multiphase voltage regulator system 100 thereafter adjusts the energy storage element charging signals in accordance with the global error correction signal to lessen this difference or error. In some situations, manufacturing variations and/or misalignment tolerances present within the multiphase voltage regulator system 100 can cause mismatches between the multiphase voltage regulator system 100. In these situations, the multiphase voltage regulator system 100 compares remaining energy storage element charging signals to the global error correction signal to provide local error correction signals to quantify these mismatches. Thereafter, the multiphase voltage regulator system 100 adjusts the remaining energy storage element charging signals in accordance with the one or more local error correction signals to compensate for these mismatches. As illustrated in FIG. 1, the multiphase voltage regulator system 100 includes a reference signal pathway 102 and regulator signal pathways 104.1 through 104.*m*. In another exemplary embodiment, the reference signal pathway 102 and the regulator signal pathways 104.1 through 104.*m* can be configured and arranged to provide a multiphase buck switching regulator.

As illustrated in FIG. 1, the reference signal pathway 102 provides a global error correction signal 152 to the regulator signal pathways 104.1 through 104.*m* to cause the analog output signal 150 to be proportional to a reference input signal 154. In the exemplary embodiment illustrated in FIG. 1, the reference signal pathway 102 includes global error circuitry 106, combination circuitry 108, reference channel circuitry 110, and an energy storage element 112. As illustrated in FIG. 1, the global error circuitry 106 provides the global error correction signal 152 based upon a comparison of the reference input signal 154 to the analog output signal 150 to determine a difference, or error, between the reference input signal 154 and the analog output signal 150. In an exemplary embodiment, the global error circuitry 106 can implemented using an error amplifier. In this exemplary embodiment, the error amplifier determines the difference, or the error, between the reference input signal 154 and the analog output signal 150 to provide the global error correction signal 152. In some situations, the error amplifier can also amplify the difference, or the error, between the reference input signal 154 and the analog output signal 150.

The combination circuitry 108 combines the global error correction signal 152 with a reference signal pathway error signal 158 to provide a reference signal pathway regulation signal 160. In an exemplary embodiment, the reference signal pathway error signal 158 represents an average value of a switching clocking signal 162.1 from among switching clocking signals 162.1 through 162.*i*. For example, the reference signal pathway error signal 158 can be implemented as a substantially constant current (DC) voltage whose value corresponds to a midpoint between a logical one and a logical zero of the switching clocking signal 162.1. As illustrated in FIG. 1, the switching clocking signals 162.1 through 162.*i* are characterized as having a substantially similar frequency as each other, but are offset in phase from each other. In another exemplary embodiment, phase offsets between the switching clocking signals 162.1 through 162.*i* may be characterized as:

$$\frac{2\pi}{i}, \quad (1)$$

where i represents the number of switching clocking signals of the switching clocking signals 162.1 through 162.*i*.

The reference channel circuitry 110 provides the energy storage element charging signal 156 based on the reference signal pathway regulation signal 160 and the switching clocking signal 162.1. In the exemplary embodiment illustrated in FIG. 1, the reference channel circuitry 110 provides the energy storage element charging signal 156 at a first logical level, such as a logical zero, when the reference signal pathway regulation signal 160 is less than the switching clocking signal 162.1 to discharge the energy storage element 112. In this exemplary embodiment, the reference channel circuitry 110 provides the energy storage element charging signal 156 at a second logical level, such as a logical one, when the reference signal pathway regulation signal 160 is greater than the switching clocking signal 162.1 to charge the energy storage element 112.

The energy storage element 112 is charged and/or discharged in response to the energy storage element charging signal 156. For example, the energy storage element charging signal 156 discharges the energy storage element 112 when the energy storage element charging signal 156 is at the first logical level. At this moment, the energy storage element 112 is providing its stored charge to the analog output signal 150 when the energy storage element charging signal 156 is at the first logical level. As such, the energy storage element 112 can be characterized as contributing to the analog output signal 150 when discharging. Otherwise in this example, the energy storage element charging signal 156 charges the energy storage element 112 when the energy storage element charging signal 156 is at the second logical level. At this moment, the energy storage element charging signal 156 is charging to the energy storage element 112 when the energy storage element charging signal 156 is at the second logical level. As such, the energy storage element 112 can be characterized as not contributing to the analog output signal 150 when charging. In an exemplary embodiment, the energy storage element 112 is implemented using one or more inductors; however, those skilled in the relevant art(s) will recognize that one or more capacitors, one or more resistors, and/or other suitable circuits can also be utilized within the energy storage element 112 without departing from the spirit and scope of the present disclosure.

Referring back to FIG. 1, the regulator signal pathways 104.1 through 104.*m* can individually adjust the global error correction signal 152 to compensate for mismatches between the reference signal pathway 102 and/or one or more of the regulator signal pathways 104.1 through 104.*m*. In the exemplary embodiment illustrated in FIG. 1, the regulator signal pathways 104.1 through 104.*m* include local channel error circuitry 114.1 through 114.*m*, combination circuitry 116.1 through 116.*m*, regulator channel circuitry 118.1 through 118.*m*, and energy storage elements 120.1 through 120.*m*. The regulator signal pathways 104.1 through 104.*m* operate in a substantially similar manner to each other; therefore, only the regulator signal pathways 104.1 is to be discussed in further detail.

As illustrated in FIG. 1, the local channel error circuitry 114.1 provides a local error correction signal 164.1 from among local error correction signals 164.1 through 164.*m* based upon a comparison of the energy storage element charging signal 156 to an energy storage element charging signal 166.1 from among energy storage element charging signals 166.1 through 166.*m*. In the exemplary embodiment illustrated in FIG. 1, the local error correction signal 164.1 represents a quantification of mismatches between the reference signal pathway 102 and the regulator signal pathway 104.1 caused by, for example, manufacturing variations and/or misalignment tolerances. As to be described in further detail below, the local error correction signal 164.1 can be used to compensate for these mismatches. In an exemplary embodiment, the local channel error circuitry 114.1 can be implemented using a difference integrator. In this exemplary embodiment, the difference integrator determines the difference, or error, between the energy storage element charging signal 156 and the energy storage element charging signal 166.1 and, thereafter, integrates this difference to provide the local error correction signal 164.1.

The combination circuitry 116.1 combines, for example, adds, the local error correction signal 164.1 with the global error correction signal 152 to provide a regulator signal pathway regulation signal 168.1 from among regulator signal pathway regulation signals 168.1 through 168.*m*. As described above, the global error correction signal 152 represents the difference, or the error, between the reference input signal 154 and the analog output signal 150. In the exemplary embodiment illustrated in FIG. 1, the combination circuitry 116.1 adds the local error correction signal 164.1 representative of the mismatches between the reference signal pathway 102 and the regulator signal pathway 104.1 to the global error correction signal 152 to compensate for these mismatches.

The regulator channel circuitry 118.1 provides the energy storage element charging signal 166.1 from among energy storage element charging signals 166.1 through 166.m based on the regulator signal pathway regulation signal 168.1 and the phase 162.2 of the switching clocking signal. In the exemplary embodiment illustrated in FIG. 1, the regulator channel circuitry 118.1 provides the energy storage element charging signal 166.1 at a first logical level, such as a logical zero, when the regulator signal pathway regulation signal 168.1 is less than the switching clocking signal 162.1 to discharge the energy storage element 120.1. In this exemplary embodiment, the regulator channel circuitry 118.1 provides the energy storage element charging signal 166.1 at a second logical level, such as a logical one, when the regulator signal pathway regulation signal 168.1 is greater than the switching clocking signal 162.1 to charges the energy storage element 120.1.

The energy storage element 120.1 is charged and/or discharged in response to the energy storage element charging signal 166.1. For example, the energy storage element charging signal 166.1 discharges the energy storage element 120.1 when the energy storage element charging signal 166.1 is at the first logical level. At this moment, the energy storage element 120.1 is discharging its stored charge to the analog output signal 150 when the energy storage element charging signal 166.1 is at the first logical level. As such, the energy storage element 120.1 can be characterized as contributing to the analog output signal 150 when discharging. Otherwise in this example, the energy storage element charging signal 166.1 charges the energy storage element 120.1 when the energy storage element charging signal 166.1 is at the second logical level. At this moment, the energy storage element charging signal 166.1 is supplying charge to the energy storage element 120.1 when the energy storage element charging signal 166.1 is at the second logical level. As such, the energy storage element 120.1 can be characterized as not contributing to the analog output signal 150 when charging. In an exemplary embodiment, the energy storage element 120.1 is implemented using one or more inductors; however, those skilled in the relevant art(s) will recognize that one or more capacitors and/or one or more resistors can also be utilized within the energy storage element 120.1 without departing from the spirit and scope of the present disclosure.

Figure 2:
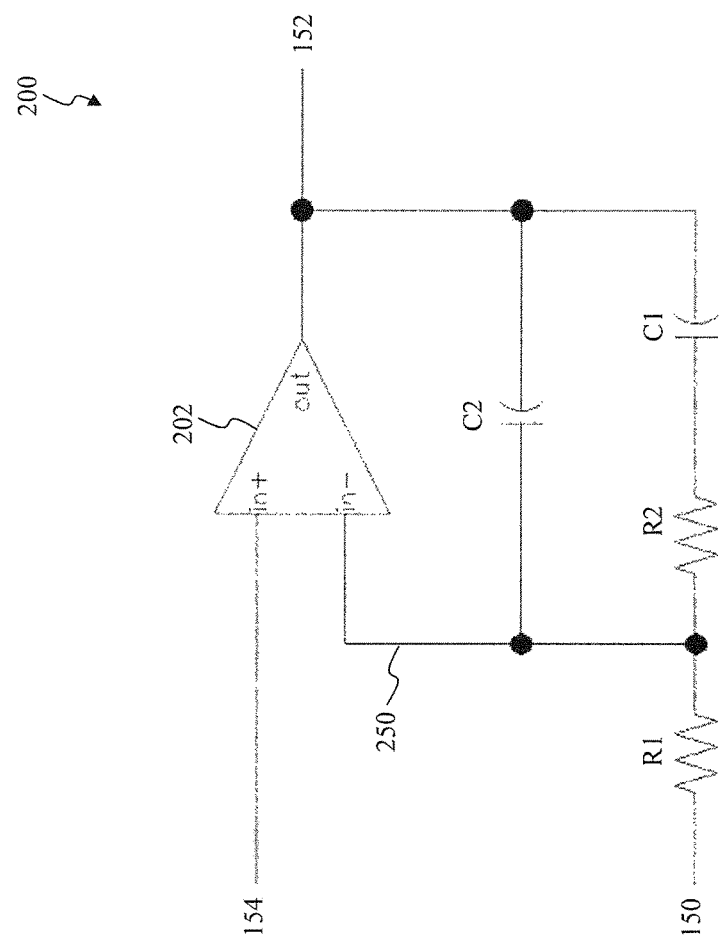
FIG. 2 illustrates a block diagram of exemplary global error circuitry within the first exemplary regulator system according to an exemplary embodiment of the present disclosure.

Exemplary Global Error Circuitry within the First Exemplary Voltage Regulator System FIG. 2 illustrates a block diagram of exemplary global error circuitry within the first exemplary regulator system according to an exemplary embodiment of the present disclosure. As illustrated in FIG. 2, global error circuitry 200 provides the global error correction signal 152 based upon the comparison of the reference input signal 154 to the analog output signal 150. In the exemplary embodiment illustrated in FIG. 2, the global error circuitry 200 includes an amplifier 202, resistors R1 and R2, and capacitors C1 and C2. The global error circuitry 200 can represent an exemplary embodiment of the global error circuitry 106 as described above in FIG. 1.

As illustrated in FIG. 2, the amplifier 202 amplifies a difference between the reference input signal 154 and a feedback signal 250 by a gain A to provide the global error correction signal 152. In an exemplary embodiment, the global error correction signal 152 can be represented as:

$$V_{152}=A(V_{154}-V_{250}), \quad (2)$$

where $V_{152}$ represents a voltage of the global error correction signal 152, $V_{154}$ represents a voltage of the reference input signal 154, $V_{250}$ represents a voltage of the feedback signal 250, and A represents a gain of amplifier 202. In this exemplary embodiment, the gain A of amplifier 202 is large enough that it can be assumed to be infinite without loss of accuracy in the calculations. In this situation, $$V_{250}=V_{154}, \quad (3)$$

The global error correction signal 152 can then be expressed in terms of the voltage of the reference input signal 154, the energy storage element charging signal 156 and passive components R1, R2, C1, and C2 as:

$$V_{152} = V_{154} + (V_{154} - V_{156})\frac{R_1(sR_2C_1 + 1)}{s^2R_2C_1C_2 + s(C_1 + C_2)} \quad (4)$$

where $V_{152}$ represents a voltage of the global error correction signal 152, $V_{154}$ represents a voltage of the reference input signal 154, $V_{156}$ represents a voltage of the energy storage element charging signal 156, $s=j2\pi f$, $j=\sqrt{-1}$, and f represents a signal frequency.

As shown by Equation (4), the voltage of the global error correction signal 152 ($V_{152}$) equals the voltage of the reference input signal 154 ($V_{154}$), when the voltage of the energy storage element charging signal 156 ($V_{156}$) is equal to the voltage of the reference input signal 154 ($V_{154}$). When the voltage of the energy storage element charging signal 156 diverges from the voltage of the reference input signal 154, the amplifier 202 amplifies this divergence onto the global error correction signal 152, with a frequency dependent gain set by the components R1, R2, C1, and C2. The global error circuitry 200 then works to adjust the energy storage element charging signal 156 until the voltage of the energy storage element charging signal 156 is again equal to voltage of the reference input signal 154. The gain A of amplifier 202 is extremely high at low frequencies, and becomes progressively lower at high frequencies to ensure stability of the global error circuitry 200. In this way, low frequency and DC errors are corrected, but the high frequency operation of the multiphase voltage regulator system 100 does not interfere with the global error circuitry 200.

Figure 3:
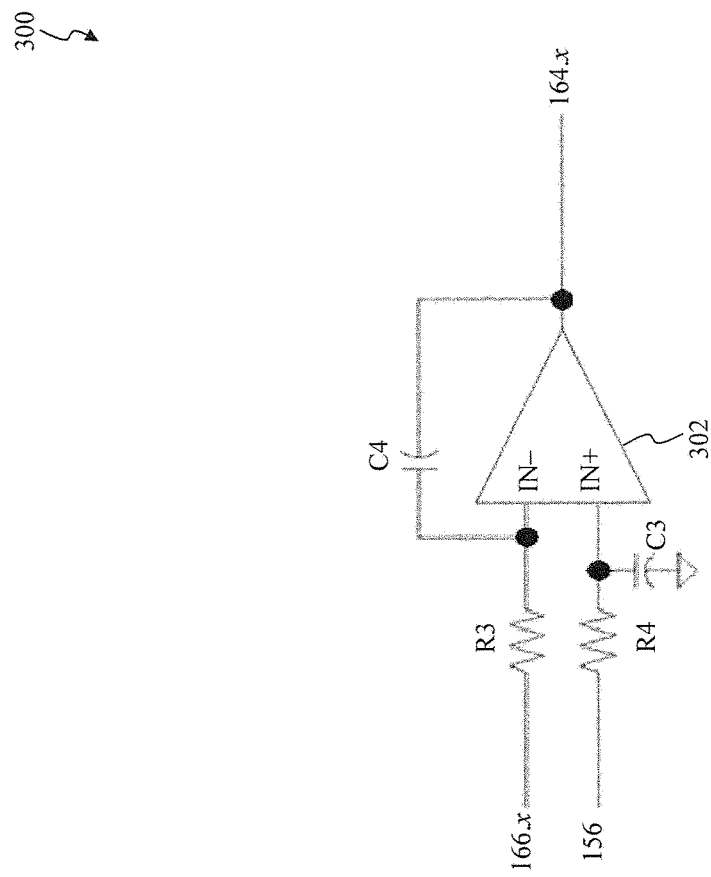
FIG. 3 illustrates a block diagram of exemplary local channel error circuitry within the first exemplary regulator system according to an exemplary embodiment of the present disclosure.

Exemplary Local Channel Error Circuitry within the First Exemplary Voltage Regulator System FIG. 3 illustrates a block diagram of exemplary local channel error circuitry within the first exemplary regulator system according to an exemplary embodiment of the present disclosure. As illustrated in FIG. 3, local channel error circuitry 300 provides a local error correction signal 164.x from among local error correction signals 164.1 through 164.m based upon a comparison of the energy storage element charging signal 156 to an energy storage element charging signal 166.x from among energy storage element charging signals 166.1 through 166.m. In the exemplary embodiment illustrated in FIG. 2, the local channel error circuitry 300 includes an amplifier 302, resistors R3 and R4, and capacitors C3 and C4. The global error circuitry 200 can represent an exemplary embodiment of one or more of the local channel error circuitry 114.1 through 114.m as described above in FIG. 1.

The amplifier 302 determines a difference between the energy storage element charging signal 166.x and the energy storage element charging signal 156 to provide the local error correction signal 164.x. In an exemplary embodiment, the local error correction signal 164.x can be represented as:

$$V_{164.x} = V_{152} + \frac{(V_{152} - V_{166.x})}{sRC}, \qquad (5)$$

where $V_{164.x}$ represents a voltage of local error correction signal 164.x, $V_{152}$ represents a voltage of global error correction signal 152, $V_{166.x}$ represents a voltage of energy storage element charging signal 166.x, R=R3=R4, C=C3=C4, s=j2πf, j=√−1, and f represents the signal frequency.

Exemplary Channel Circuitry within the First Exemplary Voltage Regulator System

Figure 4:
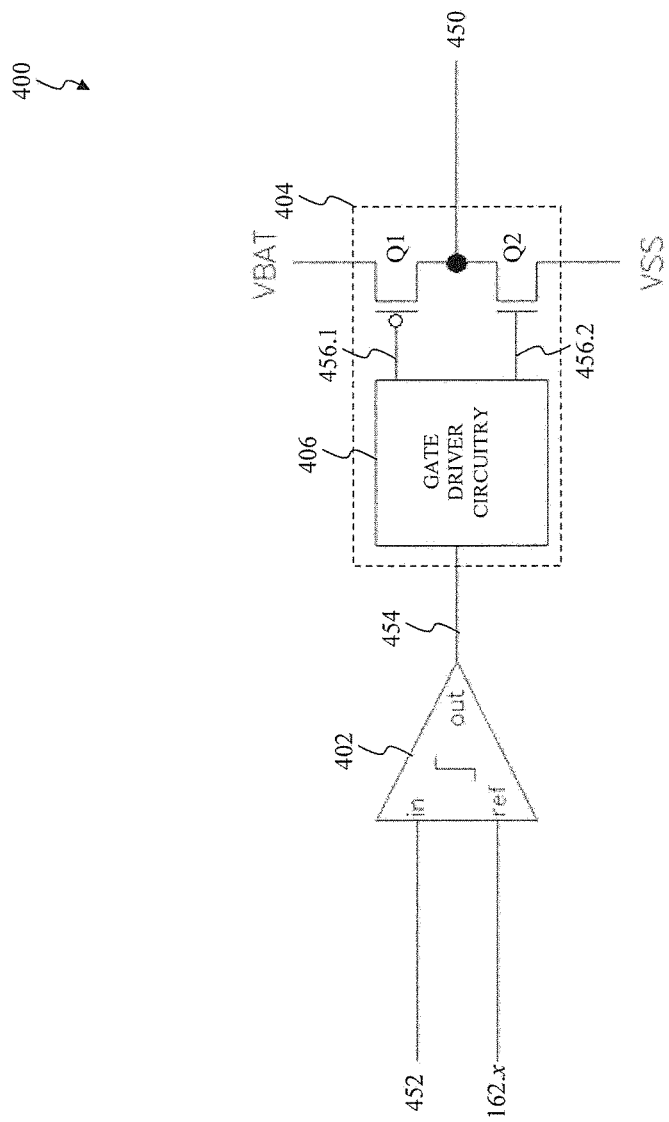
FIG. 4 illustrates a block diagram of exemplary channel circuitry within the first exemplary regulator system according to an exemplary embodiment of the present disclosure.

FIG. 4 illustrates a block diagram of exemplary channel circuitry within the first exemplary regulator system according to an exemplary embodiment of the present disclosure. As illustrated in FIG. 4, channel circuitry 400 provides an energy storage element charging signal 450 based on a comparison an energy storage element charging signal 452 and a switching clocking signal 162.x from among the switching clocking signals 162.1 through 162.i. As to be described in further detail below, the channel circuitry 400 provides the energy storage element charging signal 450 to charge and/or discharge an energy storage element, such as the energy storage element 112 and/or one of the energy storage elements 120.1 through 120.m to provide some examples, based on this comparison. In the exemplary embodiment illustrated in FIG. 4, the channel circuitry 400 includes a comparator 402 and energy storage element charging circuitry 404. The channel circuitry 400 can represent an exemplary embodiment of the reference channel circuitry 110 and/or regulator channel circuitry 118.x from among the regulator channel circuitry 118.1 through 118.m as described above in FIG. 1. As such, the energy storage element charging signal 450 can represent an exemplary embodiment of the energy storage element charging signal 156 and/or an energy storage element charging signal 166.x from among energy storage element charging signals 166.1 through 166.m and the energy storage element charging signal 452 can represent an exemplary embodiment of the reference signal pathway regulation signal 160 and/or a regulator signal pathway regulation signal 168.x from among the regulator signal pathway regulation signals 168.1 through 168.m as described above in FIG. 1.

The comparator 402 provides an energy storage element charging signal 454 based on a comparison of the energy storage element charging signal 452 and the switching clocking signal 162.x. In an exemplary embodiment, the comparator 402 provides the energy storage element charging signal 454 at the first logical level, such as a logical zero, when the switching clocking signal 162.x is greater than the energy storage element charging signal 452. Otherwise in this exemplary embodiment, the comparator 402 provides the energy storage element charging signal 454 at the second logical level, such as a logical one, when the switching clocking signal 162.x is less than the energy storage element charging signal 452.

The energy storage element charging circuitry 404 provides the energy storage element charging signal 450 based on the energy storage element charging signal 454. As illustrated in FIG. 4, the energy storage element charging circuitry includes gate driver circuitry 406, a p-type metal-oxide-semiconductor (PMOS) transistor Q1 and an n-type metal-oxide-semiconductor (NMOS) transistor Q2. The gate driver circuitry 406 provides a first transistor control signal 456.1 at the first logical level, such as a logical zero, and a second transistor control signal 456.2 at the first logical level when the energy storage element charging signal 454 is at the first logical level indicating an energy storage element, such as the energy storage element 112 and/or one of the energy storage elements 120.1 through 120.m to provide some examples, are to be charged. Otherwise, the gate driver circuitry 406 provides the first transistor control signal 456.1 at the second logical level, such as a logical one, and a second transistor control signal 456.2 at the second logical level when the energy storage element charging signal 454 is at the second logical level indicating the energy storage element is to be discharged.

The PMOS transistor Q1 is active, namely closed, when the first transistor control signal 456.1 is at the first logical level, such as a logical zero. As such, the PMOS transistor Q1 provides a first operating voltage, such as $V_{BAT}$ as illustrated in FIG. 4 to provide an example, as the energy storage element charging signal 450. Otherwise, the PMOS transistor Q1 is inactive, namely opened, when the first transistor control signal 456.1 is at the second logical level, such as a logical one. Similarly, the NMOS transistor Q2 is active, namely closed, when the second transistor control signal 456.2 is at the second logical level, such as a logical one. As such, the NMOS transistor Q2 provides a second operating voltage, such as $V_{SS}$ as illustrated in FIG. 4 to provide an example, as the energy storage element charging signal 450. Otherwise, the NMOS transistor Q2 is inactive, namely opened, when the second transistor control signal 456.2 is at the first logical level, such as a logical zero.

Second Exemplary Voltage Regulator System

Figure 5:
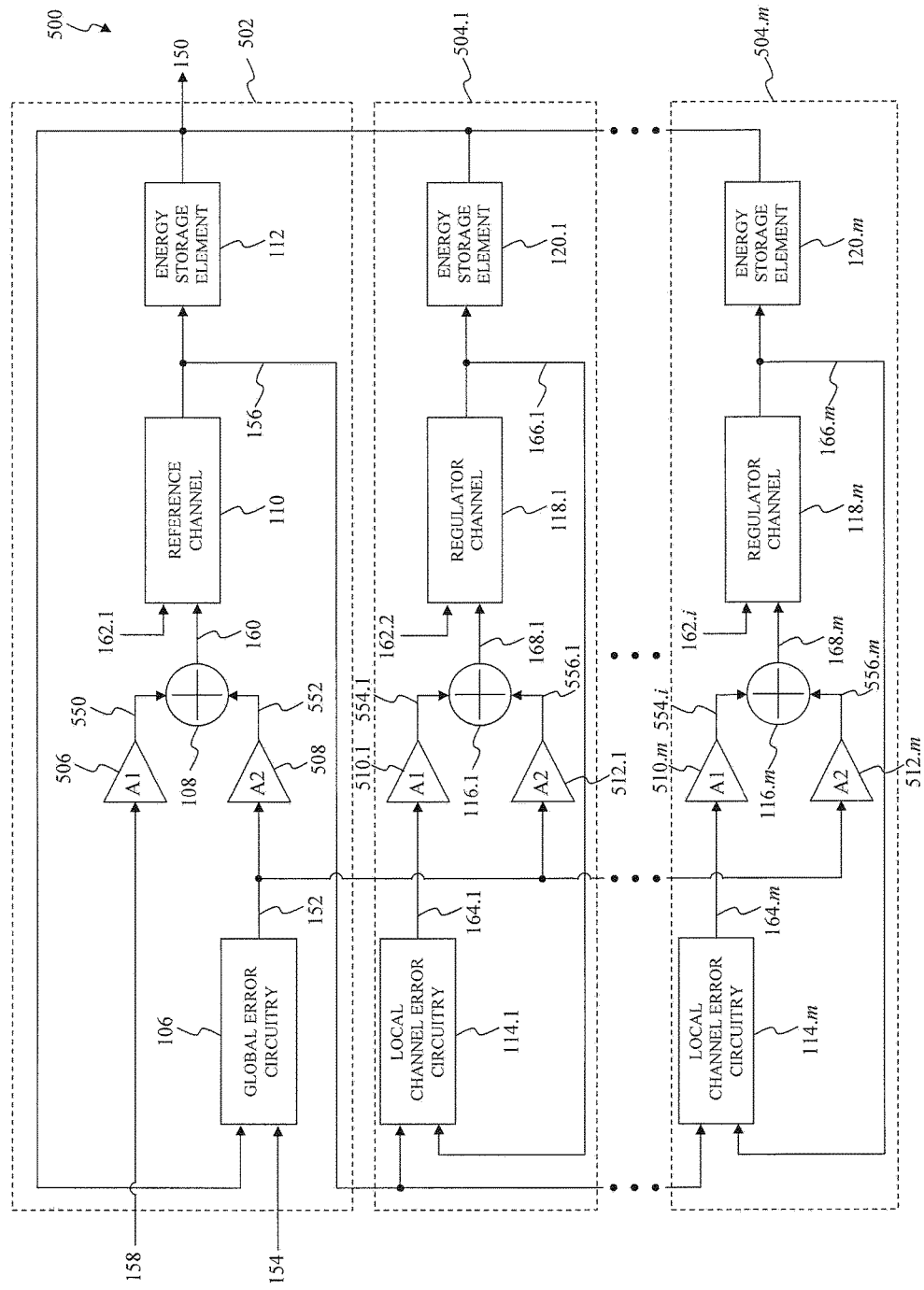
FIG. 5 illustrates a block diagram of an exemplary voltage regulator system according to an exemplary embodiment of the present disclosure.

FIG. 5 illustrates a block diagram of an exemplary voltage regulator system according to an exemplary embodiment of the present disclosure. A multiphase voltage regulator system 500 includes parallel signal pathways that functionally cooperate to provide the analog output signal 150 at a substantially constant voltage in a substantially similar manner as the multiphase voltage regulator system 100 as described above in FIG. 1. As illustrated in FIG. 5, the multiphase voltage regulator system 500 includes a reference signal pathway 502 and regulator signal pathways 504.1 through 504.m. In the exemplary embodiment illustrated in FIG. 5, the reference signal pathway 502 and the regulator signal pathways 504.1 through 504.m operate in a substantially similar manner as the reference signal pathway 102 and the regulator signal pathways 104.1 through 104.m as described above in FIG. 1; therefore, only differences between the reference signal pathway 502 and the reference signal pathway 102 and between the regulator signal pathways 504.1 through 504.m and the regulator signal pathways 104.1 through 104.m are to be described in further detail below.

As illustrated in FIG. 5, the reference signal pathway 502 provides a global error correction signal 152 to the regulator signal pathways 504.1 through 504.m to cause the analog output signal 150 to be proportional to the reference input signal 154 in a substantially similar manner as the reference signal pathway 102 as described above in FIG. 1. In the exemplary embodiment illustrated in FIG. 5, the reference signal pathway 502 includes the global error circuitry 106, the combination circuitry 108, the reference channel circuitry 110, the energy storage element 112, a first amplifier 506, and a second amplifier 508. As illustrated in FIG. 5, the first amplifier 506 amplifies the reference signal pathway error signal 158 by a first gain A1 to provide an amplified reference signal pathway error signal 550. The second amplifier 508 amplifies the global error correction signal 152 by a second gain A2 to provide an amplified global error correction signal 552. In an exemplary embodiment, the first gain A1 represents a local gain that is locally applied to the signal pathways, for example, the reference signal pathway 502 and/or the regulator signal pathways 504.1 through 504.$m$. In this exemplary embodiment, the second gain A2 represents a global gain that is globally applied the gain of the multiphase voltage regulator system 500. The combination circuitry 108 combines the amplified reference signal pathway error signal 550 and the amplified global error correction signal 552 in a substantially similar as described above in FIG. 1 to provide the reference signal pathway regulation signal 160.

As additionally illustrated in FIG. 5, the regulator signal pathways 504.1 through 504.$m$ can individually adjust the global error correction signal 152 in a substantially similar manner as the regulator signal pathways 104.1 through 104.$m$ as described above in FIG. 1 to compensate for mismatches between the reference signal pathway 502 and/or one or more of the regulator signal pathways 504.1 through 504.$m$. In the exemplary embodiment illustrated in FIG. 5, the regulator signal pathways 504.1 through 504.$m$ include the local channel error circuitry 114.1 through 114.$m$, the combination circuitry 116.1 through 116.$m$, the regulator channel circuitry 118.1 through 118.$m$, the energy storage elements 120.1 through 120.$m$, first amplifiers 510.1 through 510.$m$, and second amplifiers 512.1 through 512.$m$. As illustrated in FIG. 5, the first amplifiers 510.1 through 510.$m$ amplify the local error correction signals 164.1 through 164.$m$ by the first gain A1 to provide amplified local error correction signals 554.1 through 554.$m$. The second amplifiers 512.1 through 512.$m$ amplify the global error correction signal 152 by the second gain A2 to provide amplified global error correction signals 556.1 through 556.$i$. The combination circuitry 116.1 through 116.$m$ combines the amplified local error correction signals 554.1 through 554.$m$ and the amplified global error correction signals 556.1 through 556.1 in a substantially similar as described above in FIG. 1 to provide the regulator signal pathway regulation signals 168.1 through 168.$m$.

Exemplary Operation of the Exemplary Voltage Regulator Systems

Figure 6:
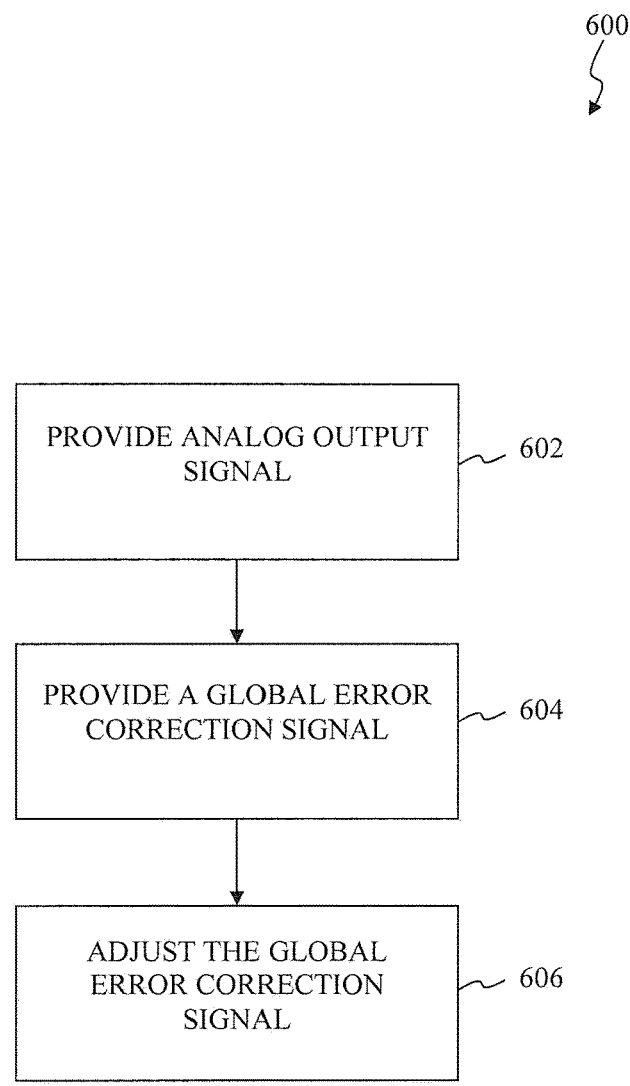
FIG. 6 illustrates a flowchart of an exemplary operation of the exemplary voltage regulator systems according to an exemplary embodiment of the present disclosure.

FIG. 6 illustrates a flowchart of an exemplary operation of the exemplary voltage regulator systems according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes exemplary operation flow 600 of a voltage regulator system, such as the voltage regulator system 100 or voltage regulator system 500 to provide some examples.

At operation 602, the exemplary operation flow 600 provides an analog output signal, such as the analog output signal 150 to provide an example, at a constant, or substantially constant, voltage. For example, the exemplary operation flow 600 provides energy storage element charging signals, such as the energy storage element charging signal 156 and/or one or more of the energy storage element charging signals 166.1 through 166.$m$ to provide some examples, to charge and/or discharge one or more energy storage elements, such as the energy storage element 112 and/or one or more of the energy storage elements 120.1 through 120.$m$ to provide some examples, in accordance with one or more switching clocking signals, such as the switching clocking signals 162.1 through 162.$i$ to provide an example, to provide the analog output signal in a substantially similar manner as described above in FIG. 1 through FIG. 5. In an exemplary embodiment, operation 602 can be performed by reference channel circuitry 110 and/or one or more of the regulator channel circuitry 118.1 through 118.$m$.

At operation 604, the exemplary operation flow 600 provides a global error correction signal, such as the global error correction signal 152 to provide an example, to to cause the analog output signal 150 to be proportional to a reference input signal, such as the reference input signal 154 to provide an example. The exemplary operation flow 600 provides the global error correction signal based upon a comparison of the reference input signal and one of the one or more energy storage element charging signals from operation 602. The global error correction signal of operation 604 represents a difference between the reference input signal and the analog output signal. In an exemplary embodiment, operation 604 can be performed by the global error circuitry 106.

At operation 606, the exemplary operation flow 600 provides one or more local error correction signals, such as one or more of the local error correction signals 164.1 through 164.$m$ to provide an example, to compensate for mismatches within the voltage regulator system resulting from manufacturing variations and/or misalignment tolerances present within the voltage regulator system in a substantially similar manner as described above in FIG. 1 through FIG. 5. The exemplary operation flow 600 can adjust the global error correction signal from operation 604 to compensate for the mismatches within the voltage regulator. In an exemplary embodiment, the flow 600 provides the one or more local error correction signals based upon a comparison of the global error correction signal from operation 604 to one or more energy storage element charging signals from among the energy storage element charging signals of operation 604. In an exemplary embodiment, operation 606 can be performed by the local channel error circuitry 114.1 through 114.$m$.

CONCLUSION

The foregoing Detailed Description discloses a multiphase voltage regulator. The multiphase voltage regulator includes a reference signal pathway and at least one regulator signal pathway. The reference signal pathway provides a first energy storage element charging signal to charge or discharge a first energy storage element in accordance with a first switching clocking signal and provides a global error correction signal based upon a comparison of the analog output signal and a reference input signal. The at least one regulator signal pathway provides a second energy storage element charging signal to charge or discharge a second energy storage element in accordance with a second switching clocking signal and a regulator signal pathway regulation signal, provides a local error correction signal based upon a comparison of the first energy storage element charging signal and the second energy storage element charging signal, and adjusts the global error correction signal by the local error correction signal to provide the regulator signal pathway regulation signal.

The foregoing Detailed Description also discloses another multiphase voltage regulator. The other multiphase voltage regulator includes global error circuitry, first combination circuitry, reference channel circuitry, local channel error circuitry, second combination circuitry, and regulator channel circuitry. The global error circuitry provides a global error correction signal based upon a comparison of an analog output signal and a reference input signal. The first combination circuitry combines the global error correction signal and a reference signal pathway error signal to provide a reference signal pathway regulation signal. The reference channel circuitry provides a first energy storage element charging signal to charge or discharge a first energy storage element based upon a comparison of the reference signal pathway regulation signal and a first switching clocking signal. The local channel error circuitry provides local error correction signals based upon a comparison of the first energy storage element charging signal and corresponding energy storage element charging signals from among energy storage element charging signals. The second combination circuitry combines the global error correction signal and the plurality of local error correction signals to provide a regulator signal pathway regulation signals. The regulator channel circuitry provides the plurality of energy storage element charging signals to charge or discharge energy storage elements based upon a comparison of the regulator signal pathway regulation signals and the switching clocking signals.

The foregoing Detailed Description further discloses a method for operating a multiphase voltage regulator. The method includes: providing energy storage element charging signals to charge or discharge energy storage elements in accordance with switching clocking signals to provide an analog output signal, providing a global error correction signal based upon a comparison of the analog output signal and a reference input signal, and providing a local error correction signal based upon a comparison of a first energy storage element charging signal from among the energy storage element charging signals and a second energy storage element charging signal.

The foregoing Detailed Description referred to accompanying figures to illustrate exemplary embodiments consistent with the disclosure. References in the foregoing Detailed Description to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The foregoing Detailed Description is not meant to limiting. Rather, the scope of the disclosure is defined only in accordance with the following claims and their equivalents. It is to be appreciated that the foregoing Detailed Description, and not the following Abstract section, is intended to be used to interpret the claims. The Abstract section can set forth one or more, but not all exemplary embodiments, of the disclosure, and thus, is not intended to limit the disclosure and the following claims and their equivalents in any way.

The exemplary embodiments described within foregoing Detailed Description have been provided for illustrative purposes, and are not intended to be limiting. Other exemplary embodiments are possible, and modifications can be made to the exemplary embodiments while remaining within the spirit and scope of the disclosure. The foregoing Detailed Description has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The foregoing Detailed Description fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A multiphase voltage regulator, comprising:
reference signal circuitry configured to:
provide a first energy storage element charging signal to charge or discharge a first energy storage element based on a first switching clock signal, wherein the first energy storage element is configured to contribute to an analog output signal in response to being discharged;
compare the analog output signal to a reference input signal to provide a global error correction signal;
combine the global error correction signal and a reference pathway error signal to provide a reference pathway regulation signal; and
at least one regulator signal circuitry configured to:
provide a second energy storage element charging signal to charge or discharge a second energy storage element based on a second switching clock signal and a regulator pathway regulation signal, wherein the second energy storage element is configured to contribute to the analog output signal in response to being discharged;

compare the first energy storage element charging signal to the second energy storage element charging signal to provide a local error correction signal and adjust the global error correction signal based on the local error correction signal.

2. The multiphase voltage regulator of claim 1, wherein the reference signal circuitry comprises:

reference channel circuitry configured to:

compare the first switching clock signal to the reference pathway regulation signal;

activate a first transistor and deactivate a second transistor in response to the first switching clock signal being less than the references pathway regulation signal to discharge the first energy storage element; and deactivate the first transistor and activate the second transistor in response to the first switching clock signal being greater than the reference pathway regulation signal to charge the first energy storage element.

3. The multiphase voltage regulator of claim 1, wherein the reference pathway error signal comprises a voltage at an average value of the first switching clock signal.

4. The multiphase voltage regulator of claim 1, wherein the at least one regulator signal circuitry comprises:

regulator channel circuitry configured to:

compare the second switching clock signal to the regulator pathway regulation signal;

activate a first transistor and deactivate a second transistor in response to the second switching clock signal being less than the regulator pathway regulation signal to discharge the second energy storage element; and P2 deactivate the first transistor and activate the second transistor in response to the second switching clock signal being greater than the regulator pathway regulation signal to charge the second energy storage element.

5. The multiphase voltage regulator of claim 4, wherein the at least one regulator signal circuitry comprises:

combination circuitry configured to combine the global error correction signal and the local error correction signal to adjust the global error correction signal.

6. The multiphase voltage regulator of claim 1, wherein the at least one regulator signal circuitry comprises:

a first regulator signal pathway configured to:

provide the second energy storage element charging signal to charge or discharge the second energy storage element based on the second switching clock signal and the regulator pathway regulation signal;

compare the first energy storage element charging signal to the second energy storage element charging signal; and adjust the global error correction signal based on the local error correction signal; and a second regulator signal pathway configured to:

provide a third energy storage element charging signal to charge or discharge a third energy storage element based on a third switching clock signal and a second regulator pathway regulation signal, wherein the third energy storage element is configured to contribute to the analog output signal in response to being discharged;

compare the first energy storage element charging signal to the third energy storage element charging signal to provide a second local error correction signal; and adjust the global error correction signal based on the second local error correction signal.

7. The multiphase voltage regulator of claim 1, wherein the reference pathway error signal is a DC voltage that corresponds to a value between a first logical level and a second logical level of the first switching clock signal.

8. A multiphase voltage regulator, comprising:

global error circuitry configured to provide a global error correction signal based on a comparison of an analog output signal to a reference input signal;

first combination circuitry configured to combine the global error correction signal and a reference pathway error signal to provide a reference pathway regulation signal;

reference channel circuitry configured to provide a first energy storage element charging signal to charge or discharge a first energy storage element based on a comparison of the reference pathway regulation signal to a first switching clock signal from among a plurality of switching clock signals;

a plurality of local channel error circuitry configured to provide a plurality of local error correction signals based on a comparison of the first energy storage element charging signal to corresponding energy storage element charging signals from among a plurality of energy storage element charging signals;

a plurality of second combination circuitry configured to combine the global error correction signal and the plurality of local error correction signals to provide a plurality of regulator pathway regulation signals; and a plurality of regulator channel circuitry configured to provide the plurality of energy storage element charging signals to charge or discharge a plurality of energy storage elements based on a comparison of the plurality of regulator pathway regulation signals to the plurality of switching clock signals.

9. The multiphase voltage regulator of claim 8, wherein the reference pathway error signal comprises a voltage at an average value of the first clock signal.

10. The multiphase voltage regulator of claim 8, wherein the reference channel circuitry comprises:

a comparator configured to provide an energy storage element charging signal based on a comparison of the reference pathway regulation signal to the first switching clock signal; and energy storage element charging circuitry configured to:

activate a first transistor and deactivate a second transistor in response to the first switching clock signal being less than the reference pathway regulation signal to discharge the first energy storage element; and deactivate the first transistor and activate the second transistor in response to the first switching clock signal being greater than the reference pathway regulation signal to charge the first energy storage element.

11. The multiphase voltage regulator of claim 8, wherein at least one of the plurality of regulator channel circuitry comprises:

a comparator configured to provide an energy storage element charging signal based on a comparison of a regulator pathway regulation signal from among the plurality of regulator pathway regulation signals to a switching clock signal from among the plurality of switching clock signals; and energy storage element charging circuitry configured to:
- activate a first transistor and deactivate a second transistor in response to the second switching clock signal being less than the regulator pathway regulation signal to discharge a second energy storage element from among the plurality of energy storage elements; and
- deactivate the first transistor and activate the second transistor in response to the second switching clock signal being greater than the regulator pathway regulation signal to charge the second energy storage element.

12. The multiphase voltage regulator of claim 8, wherein the plurality of second combination circuitry is configured to combine the global error correction signal and the plurality of local error correction signals to compensate for mismatches between the plurality of regulator channel circuitry and the reference channel circuitry.

13. The multiphase voltage regulator of claim 8, further comprising:
a first amplifier configured to amplify the reference pathway error signal by a first gain to provide an amplified reference pathway error signal; and
a second amplifier configured to amplify the global error correction signal by a second gain to provide an amplified global error correction signal,
wherein the first combination circuitry is configured to combine the amplified reference pathway error signal and the amplified reference signal pathway error signal to provide the reference pathway regulation signal.

14. The multiphase voltage regulator of claim 13, further comprising:
a plurality of first amplifiers configured to amplify the plurality of local error correction signals by the first gain to provide a plurality of amplified local error correction signals; and
a plurality of second amplifiers configured to amplify the global error correction signal by the second gain to provide a plurality of amplified global error correction signals,
wherein the plurality of second combination circuitry is configured to combine the plurality of amplified local error correction signals and the plurality of amplified global error correction signals to provide the plurality of regulator pathway regulation signals.

15. The multiphase voltage regulator of claim 8, wherein the global error circuitry comprises an error amplifier configured to:
determine a difference between the first energy storage element charging signal and the reference input signal; and
amplify the difference to provide the global error correction signal based on a comparison of the first energy storage element charging signal to the reference input signal.

16. A method for operating a multiphase voltage regulator, the method comprising:
providing a plurality of energy storage element charging signals to charge or discharge a plurality of energy storage elements based on a plurality of switching clock signals to provide an analog output signal;
comparing the analog output signal to a reference input signal to provide a global error correction signal;
combining the global error correction signal and a reference pathway error signal to provide a reference pathway regulation signal; and
comparing a first energy storage element charging signal from among the plurality of energy storage element charging signals to a second energy storage element charging signal from among the plurality of energy storage element charging signals to provide a local error correction signal.

17. The method of claim 16,
wherein the providing the plurality of energy storage element charging signals comprises:
providing a first energy storage element charging signal from among the plurality of energy storage element charging signals at a first logical level to charge a first energy storage element from among the plurality of energy storage elements based on a first switching clock signal from among the plurality of switching clock signals in response to the reference pathway regulation signal being at the first logical level; and
providing the first energy storage element charging signal at a second logical level to discharge the first energy storage element based on the first switching clock signal in response to the reference pathway regulation signal being at the second logical level.

18. The method of claim 17, wherein the reference pathway error signal comprises a voltage at an average value of the first switching clock signal.

19. The method of claim 16, further comprising:
combining the local error correction signal and the global error correction signal to provide a regulator pathway regulation signal,
wherein the providing the plurality of energy storage element charging signals comprises:
providing a first energy storage element charging signal from among the plurality of energy storage element charging signals at a first logical level to charge a first energy storage element from among the plurality of energy storage elements in response to the regulator pathway regulation signal being at the first logical level; and
providing the first energy storage element charging signal at a second logical level to discharge the first energy storage element in response to the regulator pathway regulation signal being at the second logical level.

20. The method of claim 19, wherein the combining the local error correction signal and the global error correction signal comprises:
combining the local error correction signal and the global error correction signal to compensate for mismatches between a first signal pathway and a second signal pathway.

* * * * *